United States Patent
Pignataro et al.

(10) Patent No.: US 8,351,329 B2
(45) Date of Patent: Jan. 8, 2013

(54) UNIVERSAL LOAD-BALANCING TUNNEL ENCAPSULATION

(75) Inventors: Carlos M. Pignataro, Raleigh, NC (US); Clarence Filsfils, Brussels (BE); Pradosh Mohapatra, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 297 days.

(21) Appl. No.: 12/881,238

(22) Filed: Sep. 14, 2010

(65) Prior Publication Data

US 2012/0063314 A1   Mar. 15, 2012

(51) Int. Cl.
*H04J 1/16* (2006.01)
*H04J 3/24* (2006.01)

(52) U.S. Cl. ........................................ 370/230

(58) Field of Classification Search ........... 370/230.235, 370/392, 393, 400, 401, 474
See application file for complete search history.

(56) References Cited

U.S. PATENT DOCUMENTS

| | | |
|---|---|---|
| 6,295,296 B1 | 9/2001 | Tappan |
| 6,430,155 B1 | 8/2002 | Davie et al. |
| 6,512,744 B1 | 1/2003 | Hughes et al. |
| 6,603,756 B1 | 8/2003 | Tappan |
| 6,732,314 B1 * | 5/2004 | Borella et al. ............ 714/752 |
| 6,886,118 B2 | 4/2005 | Rose et al. |
| 6,987,762 B2 * | 1/2006 | Shiota ..................... 370/389 |
| 7,006,526 B1 | 2/2006 | Biederman |
| 7,068,645 B1 | 6/2006 | Phadnis et al. |
| 7,088,718 B1 | 8/2006 | Srivastava |
| 7,110,363 B1 | 9/2006 | Lawrence et al. |
| 7,139,276 B1 | 11/2006 | Sitaraman et al. |
| 7,233,575 B1 | 6/2007 | Jarvis |
| 7,313,093 B1 | 12/2007 | Eatherton et al. |
| 7,328,237 B1 | 2/2008 | Thubert et al. |
| 7,453,887 B2 | 11/2008 | Thubert et al. |
| 7,460,516 B1 | 12/2008 | Smith et al. |
| 7,512,702 B1 | 3/2009 | Srivastava et al. |
| 7,522,603 B2 | 4/2009 | Vasseur |
| 7,580,417 B2 | 8/2009 | Ervin et al. |
| 7,606,916 B1 | 10/2009 | Potter et al. |
| 7,707,300 B1 | 4/2010 | Champagne |
| 7,724,746 B2 | 5/2010 | Valtchev et al. |

(Continued)

OTHER PUBLICATIONS

Filsfils, et al., "Load Balancing for Mesh Softwires", <draft-ietf-softwire-lb-03.txt>, Network Working Group Request for Comments 5640, Aug. 2009, 6 pages.

(Continued)

*Primary Examiner* — Andrew Lee
(74) *Attorney, Agent, or Firm* — Cesari and McKenna, LLP

(57) ABSTRACT

In one embodiment, packets received at head-end nodes in a computer network may have a payload and protocol ID of an original protocol of the packet. To allow load balancing across the network, the head-end node may convert the protocol ID to indicate a UDP packet, and may insert a UDP shim header into the packet having a load balance ID, at least one port ID of a destination tail-end node of the packet, and an indication of the original protocol ID. The head-end node may transmit the converted UDP packet toward the tail-end node as part of a load-balanced UDP flow based on the load balance ID. Tail-end nodes may receive UDP packets, and determine whether they are converted UDP packets. If so, the original protocol of the packet may be determined, the UDP header may be removed, and the packet may be processed according to the original protocol.

20 Claims, 8 Drawing Sheets

U.S. PATENT DOCUMENTS

| | | | |
|---|---|---|---|
| 7,733,867 B2* | 6/2010 | Conner et al. | 370/394 |
| 7,869,428 B2* | 1/2011 | Shake et al. | 370/389 |
| 8,039,627 B2* | 10/2011 | Gano | 546/95 |
| 2001/0021189 A1* | 9/2001 | Shiota | 370/389 |
| 2004/0160952 A1* | 8/2004 | Borella et al. | 370/355 |
| 2006/0106938 A1 | 5/2006 | Dini et al. | |
| 2008/0031263 A1 | 2/2008 | Ervin et al. | |
| 2010/0008363 A1* | 1/2010 | Ee et al. | 370/392 |
| 2010/0027534 A1* | 2/2010 | Wu et al. | 370/355 |
| 2010/0046537 A1* | 2/2010 | Perlmutter et al. | 370/419 |
| 2011/0038373 A1* | 2/2011 | Shake et al. | 370/389 |

OTHER PUBLICATIONS

Mohapatra, et al., "The BGP Encapsulation Subsequent Address Family Identifier (SAFI) and the BGP Tunnel Encapsulation Attribute", Network Working Group Request for Comments 5512, Apr. 2009, 13 pages.

Mohapatra, et al., "BGP Link Bandwidth Extended Community", <draft-ietf-idr-link-bandwidth-01.txt>, Network Working Group Internet Draft, Feb. 2010, 6 pages.

* cited by examiner

UNIVERSAL LOAD-BALANCING TUNNEL ENCAPSULATION

TECHNICAL FIELD

The present disclosure relates generally to computer networks, and, more particularly, to load balancing traffic on computer networks.

BACKGROUND

It is generally desired to improve load balancing within a computer network, particularly for certain virtual interface (e.g., tunnel, pseudowire, softwire) scenarios. Specifically, it is often the case in a computer network that certain links of the network are over-utilized, while others remain under-utilized. Load balancing typically consists of using some algorithm to divide the traffic of the network among a plurality of paths to reach the destinations, in order to distribute the load on the links and nodes of the network. In addition, most load balancing techniques conventionally ensure that a traffic flow traverses the same path in order to avoid packet mis-ordering or other problems.

For networks where virtual interfaces are used, it can be difficult if not impossible to identify a particular flow, since the traffic is generally encapsulated according to the virtual interface's protocol. One solution is to load balance based on the individual virtual interfaces (e.g., each interface uses an independent path) or their protocols (e.g., each virtual interface protocol uses an independent path). However, these arrangements may lack versatility under certain network configurations, and may be limited in terms of path diversification given the differentiating factors used for load balancing division. Further, configuring all of the nodes within a computer network to understand a new load balancing algorithm may be costly, cumbersome, and inconvenient.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
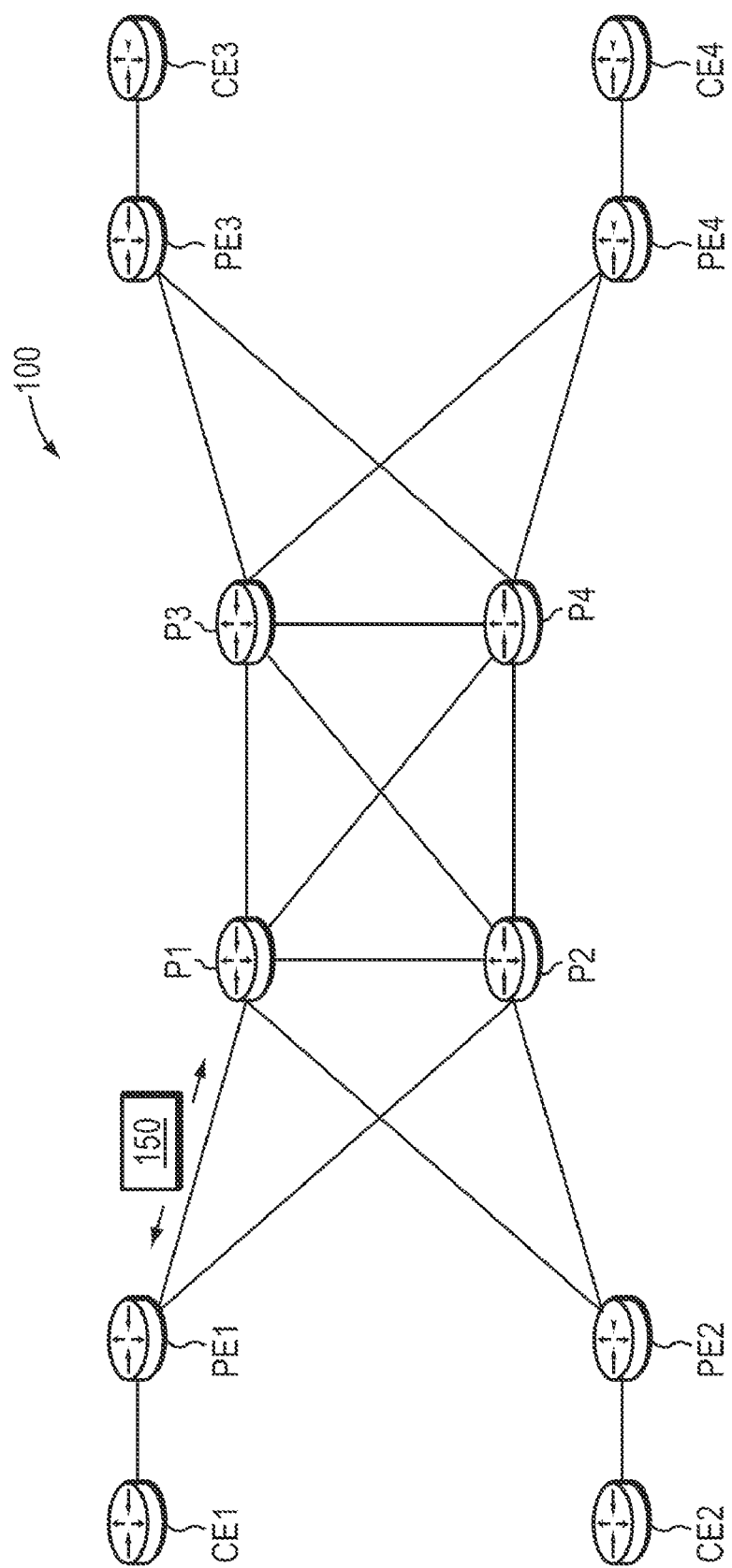
FIG. 1 illustrates an example computer network.

According to one or more embodiments of the disclosure, a packet received at a head-end node in a computer network may have a payload and a protocol identifier (ID) of an original protocol of the packet. In order to allow load balancing across the network, the head-end node may convert the protocol ID to indicate a user datagram protocol (UDP) packet, and may insert a UDP shim header into the packet that has a load balance ID, at least one port ID of a destination tail-end node of the packet, and an indication of the original protocol ID. The head-end node may then transmit the converted UDP packet toward the tail-end node as part of a load-balanced UDP flow based on the load balance ID. In addition, the tail-end node may receive UDP packets, and determine, based on its UDP header, whether the received UDP packet was transmitted as a converted UDP packet. If so, then the original protocol of the packet may be determined, the UDP header may be removed, and the tail-end node may process the packet according to the original protocol.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Since management of interconnected computer networks can prove burdensome, smaller groups of computer networks may be maintained as routing domains or autonomous systems. The networks within an autonomous system (AS) are typically coupled together by conventional "intradomain" routers configured to execute intradomain routing protocols, and are generally subject to a common authority. To improve routing scalability, a service provider (e.g., an ISP) may divide an AS into multiple "areas" or "levels." It may be desirable, however, to increase the number of nodes capable of exchanging data; in this case, interdomain routers executing interdomain routing protocols are used to interconnect nodes of the various ASes. Moreover, it may be desirable to interconnect various ASes that operate under different administrative domains. As used herein, an AS, area, or level is generally referred to as a "domain."

FIG. 1 is a schematic block diagram of an example computer network 100, e.g., a service provider "core" network, illustratively comprising nodes/devices interconnected by links as shown. For example, the illustrative network 100 may comprise one or more customer edge (CE) devices CE1-4 (representing respective customer networks) which are interconnected to a provider network via one or more provider edge (PE) devices PE1-4 located at the periphery of the network. The PE devices may in turn be interconnected via one or more intermediate (core) nodes or provider (P) devices P1-4 within the core of the network, as may be appreciated by those skilled in the art. Those skilled in the art will understand that any number of nodes, devices, links, etc. may be used in the computer network, and that the view shown herein is for simplicity. Those skilled in the art will also understand that while the embodiments described herein is described generally with relation to a provider network, it may apply to any network configuration within an Autonomous System (AS) or area, or throughout multiple ASes or areas, etc.

Data packets 140 (e.g., traffic sent between the client and server) may be exchanged among the nodes/devices of the computer network 100 using predefined network communication protocols such as the Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, various tunneling protocols, etc., as noted herein.

Figure 2:
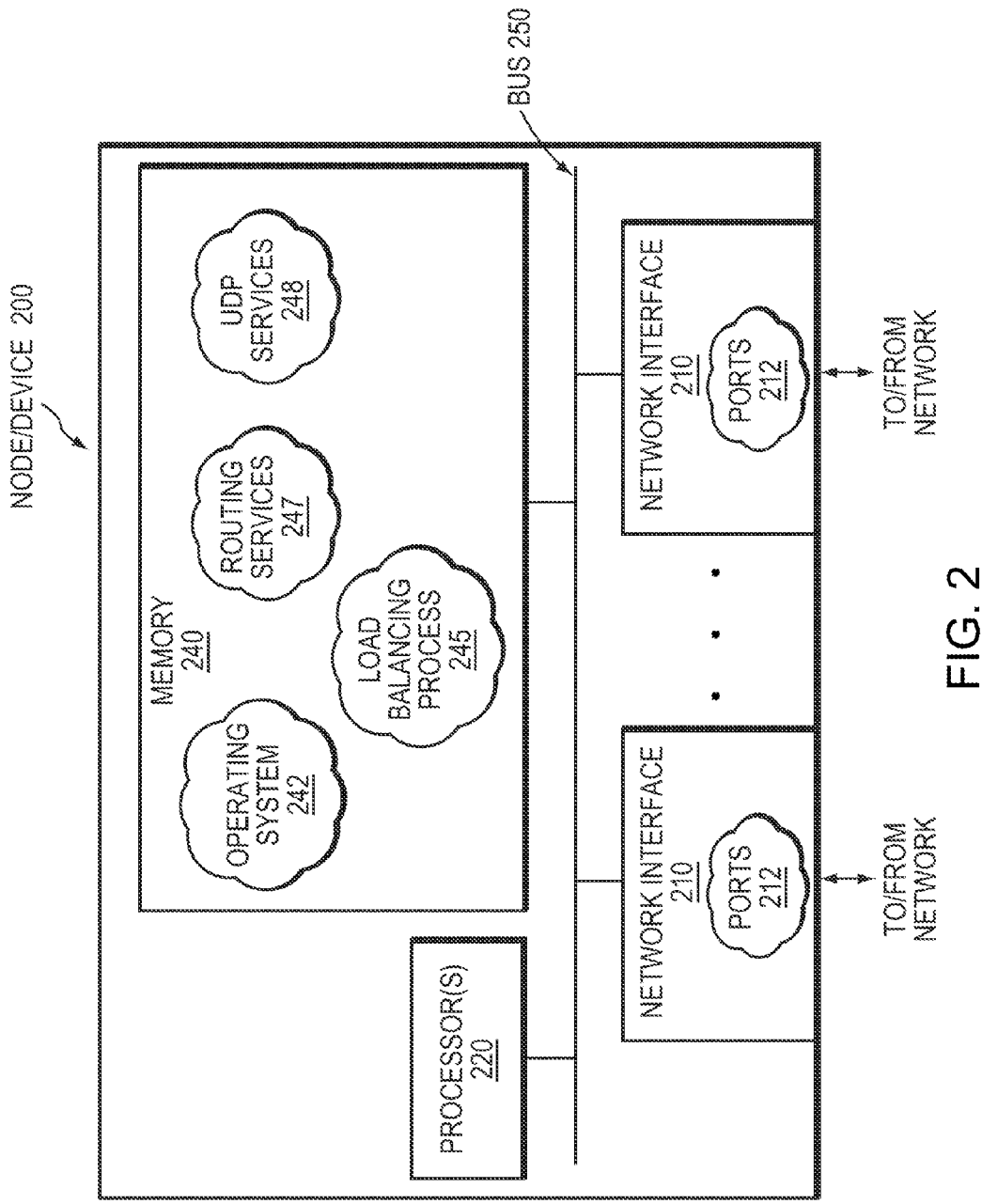
FIG. 2 illustrates an example network device/node.

FIG. 2 is a schematic block diagram of an example node/device 200 that may be used with one or more embodiments described herein, e.g., as a PE device (or P device). The device comprises a plurality of network interfaces 210, one or more processors 220, and a memory 240 interconnected by a system bus 250. The network interfaces 210 contain the mechanical, electrical, and signaling circuitry for communicating data over physical links coupled to the network 100. The network interfaces may be configured to transmit and/or receive data using a variety of different communication protocols, including, inter alia, TCP/IP, UDP, ATM, synchronous optical networks (SONET), wireless protocols, Frame Relay, Ethernet, Fiber Distributed Data Interface (FDDI), etc. Notably, a physical network interface 210 may also be used to implement one or more virtual network interfaces, such as for Virtual Private Network (VPN) access, known to those skilled in the art. Further, network interfaces 210 may be configured transmit and/or receive traffic (e.g., packets) according to one or more port configurations 212, which may be specific to each network interface as shown, or may be generally controlled by the device 200. Specifically, a port is a software structure that is identified by a port number or identifier (ID), e.g., a 16 bit integer value. Generally, ports are considered to fall within one of three ranges: permanent/controlled ports, registered ports, and dynamic (private) ports, which are neither controlled nor registered.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 247, user datagram protocol (UDP) process/services 248, and a load balancing service/process 245, each as described herein. It will be apparent to those skilled in the art that other types of processors and memory, including various computer-readable media, may be used to store and execute program instructions pertaining to the techniques described herein.

Routing services 247 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 247 may also perform functions related to virtual routing protocols, such as maintaining VRF instances, or tunneling protocols, such as for Multi-Protocol Label Switching (MPLS), etc., each as will be understood by those skilled in the art.

As noted above, it is generally desired to improve load balancing within a computer network, particularly for certain virtual interface (e.g., tunnel, pseudowire, softwire) scenarios. For networks where virtual interfaces are used, however, it can be difficult if not impossible to identify a particular flow, since the traffic is generally encapsulated according to the virtual interface's protocol. One solution is to load balance based on the individual virtual interfaces, such that each virtual interface uses an independent path, or their protocols, such that each virtual interface protocol uses an independent path. As pointed out above, though, these arrangements may lack versatility under certain network configurations, and may be limited in terms of path diversification given the differentiating factors used for load balancing division.

According to one or more embodiments of the disclosure, therefore, UDP ports may be used in a novel way that is algorithmically computed (and the range signaled a priori) to achieve load balancing in the core for all IP protocols. Generally, the IP protocol identification and L4 content of a packet are preserved, and there is only a minimal increase in the packet size by adding a "shim" UDP headers, all while increasing per-flow entropy for load balancing in the network. Also, the techniques may be used for load balancing in core network routers, without any change to those core network routers (which support UDP). Further, the techniques avoid necessitating a customized solution for each individual IP protocol (and future updates for future protocols), and do not require deep packet inspection (DPI) of the packet's carried payload. (Note, however, that customized solutions and DPI may still be used in conjunction with the techniques herein, such as for other purposes.)

In particular, these features may be achieved by converting a protocol identification of the packet to a UDP packet, inserting a UDP shim header into the packet, and signifying a load balance ID, at least one port ID of a destination tail-end node of the packet, and an indication of the original protocol ID. In this manner, the head-end node may then transmit the converted UDP packet toward the tail-end node as part of a load-balanced UDP flow based on the load balance ID using UDP load balancing techniques.

Illustratively, the techniques described herein may be performed by hardware, software, and/or firmware, such as in accordance with a load balancing process 245, which may contain computer executable instructions executed by the processor 220 to perform functions relating to the novel techniques described herein, e.g., in conjunction with routing process 247 and UDP services 248. UDP services 248 contain computer executable instructions executed by processor 220 to perform functions related specifically to the User Datagram Protocol (UDP), generally defined by RFC 768 of the Internet Engineering Task Force (IETF). Specifically, UDP offers a transport service (non-guaranteed datagram delivery), and gives applications direct access to the datagram service of the IP layer. UDP is connectionless, and data is sent from one computer to another using an IP address and port with the hope that the data is received correctly. UDP load balancing, in general, has been achieved despite the connectionless behavior through various techniques, including using source and destination addresses and ports, and forcing all data being sent from one source address/port to a particular destination address/port along a first flow path, e.g., for a certain period of time, and other source/destination combinations about other flow paths, accordingly.

The techniques herein take advantage of the fact that substantially every router today includes UDP and TCP source and destination ports in a load-balancing hash, both in hardware and software switching. This new methods can be used for many IP Protocol or tunneling protocol. For instance, the protocols may comprise, e.g., a virtual interface (VI) protocol, a tunnel protocol, a pseudowire protocol, a layer-2 tunneling protocol (L2TP)-over-IP protocol, a generic route encapsulation (GRE) protocol, an IP-in-IP protocol, an encapsulating security payload (ESP) protocol, an authentication header (AH) protocol, an IP version 6 (IPv6) protocol, an IP version 4 (IPv4) protocol, an IPv6-in-IP protocol, a multiprotocol label switching (MPLS)-in-IP protocol, a resource reservation protocol (RSVP), and a universal transport interface (UTI) protocol.

Operationally, when a designated router (e.g., PE routers) receive a packet destined for load balancing, the packet may be converted to a UDP packet. For example, FIG. 3A illustrates an example packet format 300a which may be received by the acting device. The packet 300a may comprise a header 310 having a protocol identifier (ID) or "PID" 312, and a payload 330. As such, assume that the initial packet to be transmitted (e.g., tunneled) through the network is:

[IP PID=X][X Payload].

In this instance, "X" indicates the original received protocol type of the packet (e.g., typically L2TPv3, GRE, ESP, IP-in-IP, etc.), and according to the protocol, a certain "X payload" is included with the packet.

Figure 3B:
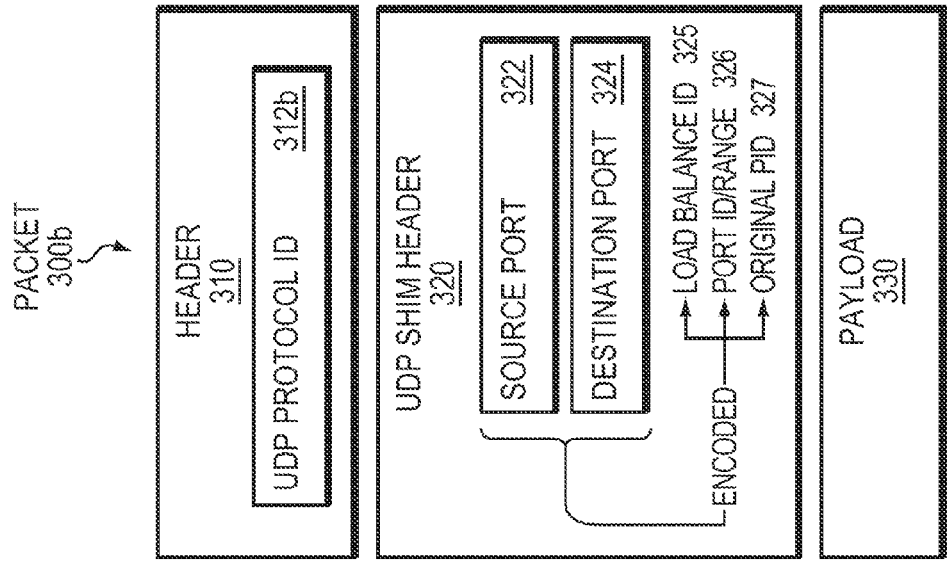
FIGS. 3A-B illustrate example packet formats.
Figure 3A:
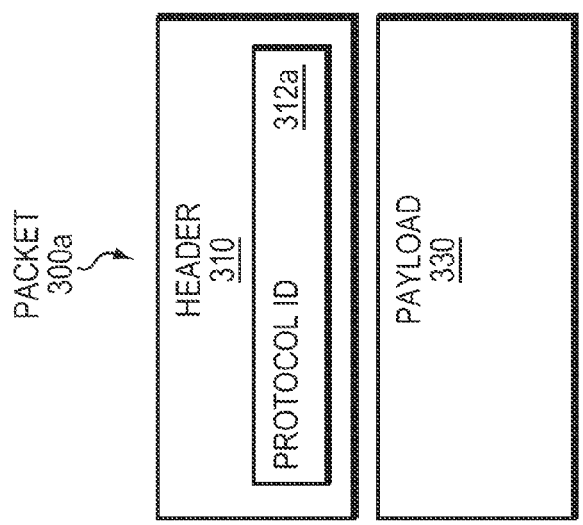

According to the techniques herein, then, the new packet to be transmitted is shown in FIG. 3B, and comprises an additional UDP shim header 320. For instance, the packet 300b may now be represented as:

[IP PID=UDP][UDP Header][X Payload]

The UDP header 320 comprises a source port field 322 and destination port field 324, the semantics of which are defined herein. Specifically, in one or more illustrative embodiments, the source port field 322 may be used to encode a load balance ID 325 (a flow identifier). The field (e.g., 16 bits) is varied in encapsulation and encodes the flow to be load-balanced. That is, for a given flow, the source port is the same, hence using different source ports for different flows allows for flow-aware load-balancing. Notably, this further allows for a single virtual interface (e.g., tunnel) to be divided into a number of load-balanced UDP flows.

In this illustrative embodiment, the destination port field 324 may be used to encode a range of port IDs 326 of a destination tail-end node of the packet (e.g., another PE router), as well as an indication of the original protocol ID 327 (indicating the ID from field 312a of packet 300a). For example, the destination port field may be partitioned in two (e.g., each 8-bit) fields. A first partition, e.g., a high order 8-bit part of the destination port, may be used to encode a value that the receiving destination device (a decapsulator) matches to understand that the packet is to be processed as a load-balanced packet. A second partition, e.g., a low order 8-bit part of the destination port, may be used to encode the original protocol number, e.g., L2TPv3-over-IP (115), GRE (47), IP-in-IP (94), ESP (50), AH (51), IPv6 (41), UTI (120), MPLS-in-IP (137), etc.

Figure 4A:
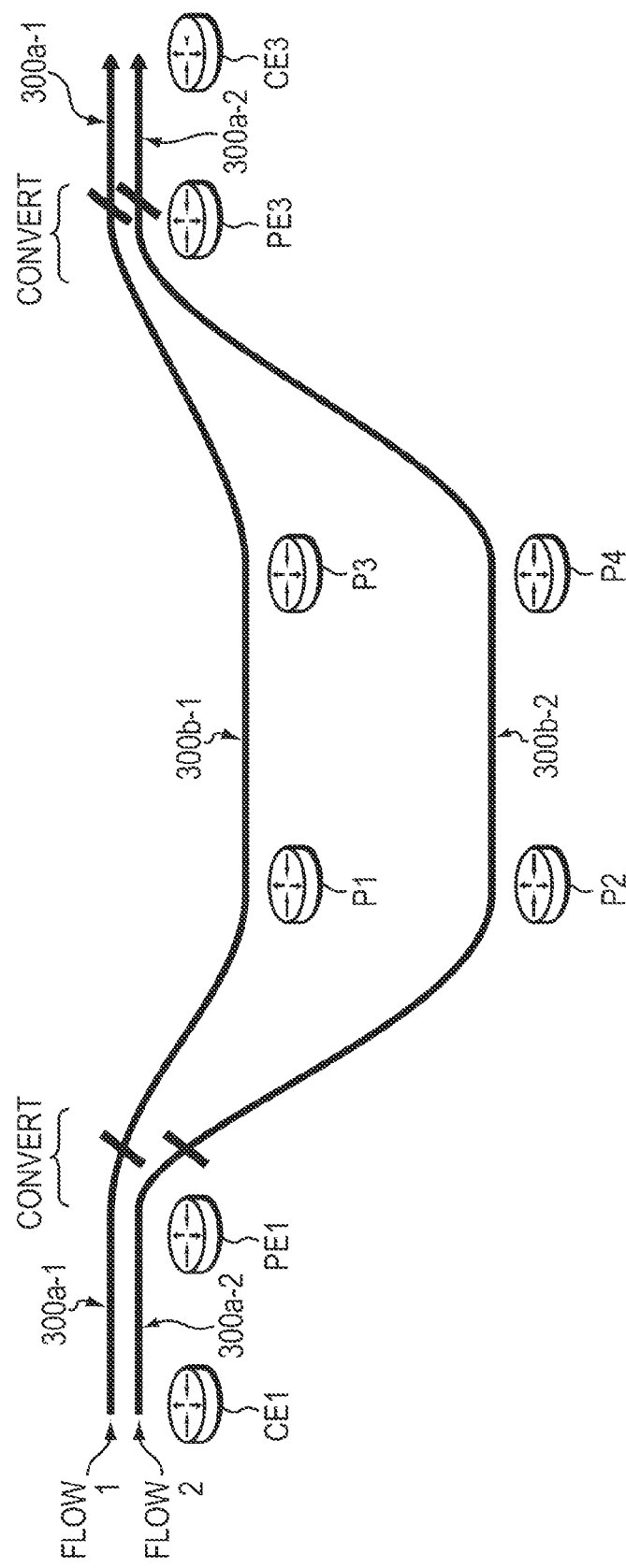
FIGS. 4A-C illustrate example packet exchanges.

As an example, FIG. 4A illustrates a simplified view of network 100 with a first customer device CE1, a head-end node (e.g., PE1), a network of intermediate nodes (e.g., core/P routers), a tail-end node (e.g., PE3), and a second customer device CE3. Assume for the example that there is initially a non-load-balanced virtual interface (tunnel, softwire, etc.) between the two PEs. PE3 may advertise its capability and desire to load balance this virtual interface, such as when the interface is first signaled. For example, such an advertisement may be relayed using a new sub-TLV for a BGP Tunnel Encapsulation Attribute, such as defined by Request for Comment (RFC) 5512 of the Internet Engineering Task Force. In this advertisement, the range of destination UDP ports to be used in corresponding field 326 may also be signaled. Specifically, a Universal Load Balance sub-TLV may indicate a value that defines a range of UDP ports to be addressed to PE3. For instance, assume that PE3 advertises "0xCA", that means that the range of UDP ports that PE3 would process according to the techniques herein, and thus that PE1 would use as destination port range 326, is 0xCA00 through 0xCAFF (51712-51967).

Upon receiving a packet (e.g., from CE1), the encapsulating head-end node (PE1) converts the protocol ID 312a to indicate a UDP packet (312b) and inserts the UDP shim header 320 into the packet. As part of the rewrite, PE1 populates the UDP header fields with information indicative of a load balance ID 325, at least one port ID 326 of a destination tail-end node of the packet, and an indication of the original protocol ID 327. The head-end node may then transmit the converted UDP packet toward the tail-end node as part of a load-balanced UDP flow based on the load balance ID.

Intermediate nodes (e.g., P routers in the core) may receive and process the converted UDP packet as a UDP packet based on the UDP header, and perform load balance techniques based on the embedded UDP Port fields, therefore directing different flows 300a-1 and 300a-2 (e.g., within a given virtual interface/circuit) onto different paths (e.g., 300b-1 and 300b-2). Illustratively, according to conventional UDP load balancing, the different paths may be equal cost multipath (ECMP) paths. In other words, by "encapsulating" the traffic as UDP packets (datagrams) in this manner, the intermediate nodes may load-balance using UDP techniques, and the encapsulating router (head-end node) may give different flow-IDs 325 to different flows as desired to control the load balancing granularity, accordingly.

Upon receiving each UDP packet 300b, the tail-end node may determine whether the received UDP packet was transmitted as a converted UDP packet based on the UDP header 320. For instance, this determination may be specifically made by determining that the port ID 326 within the UDP header indicates a port of the tail-end node configured to receive converted UDP packets, as advertised above. Conventional UDP packets are simply processed as UDP packets. Converted UDP packets, however, may be processed to determine the original protocol 312a of the packet indicated within the UDP header (field 327). Accordingly, the UDP header 320 may be removed from the packet 300b, and the packet (e.g., effectively 300a now) may be processed according to the original protocol (e.g., forwarded to CE3).

Figure 4B:
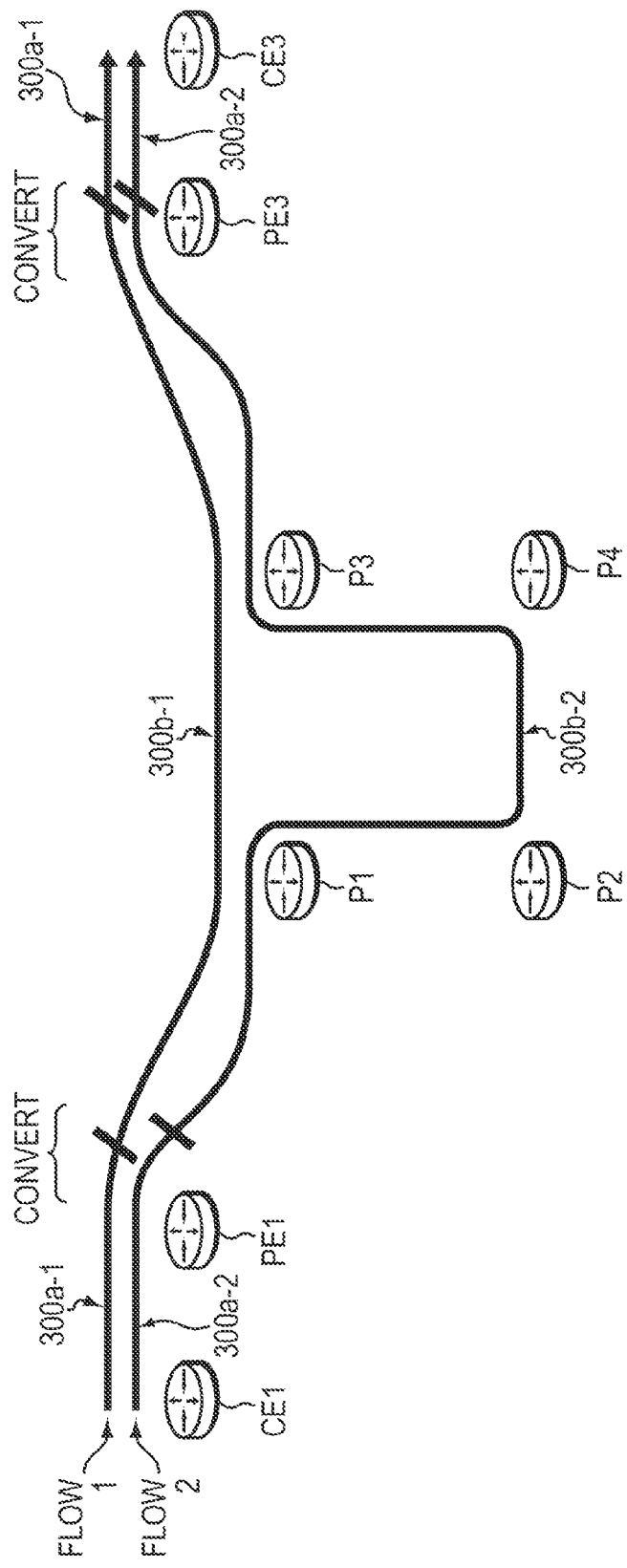
Figure 4C:
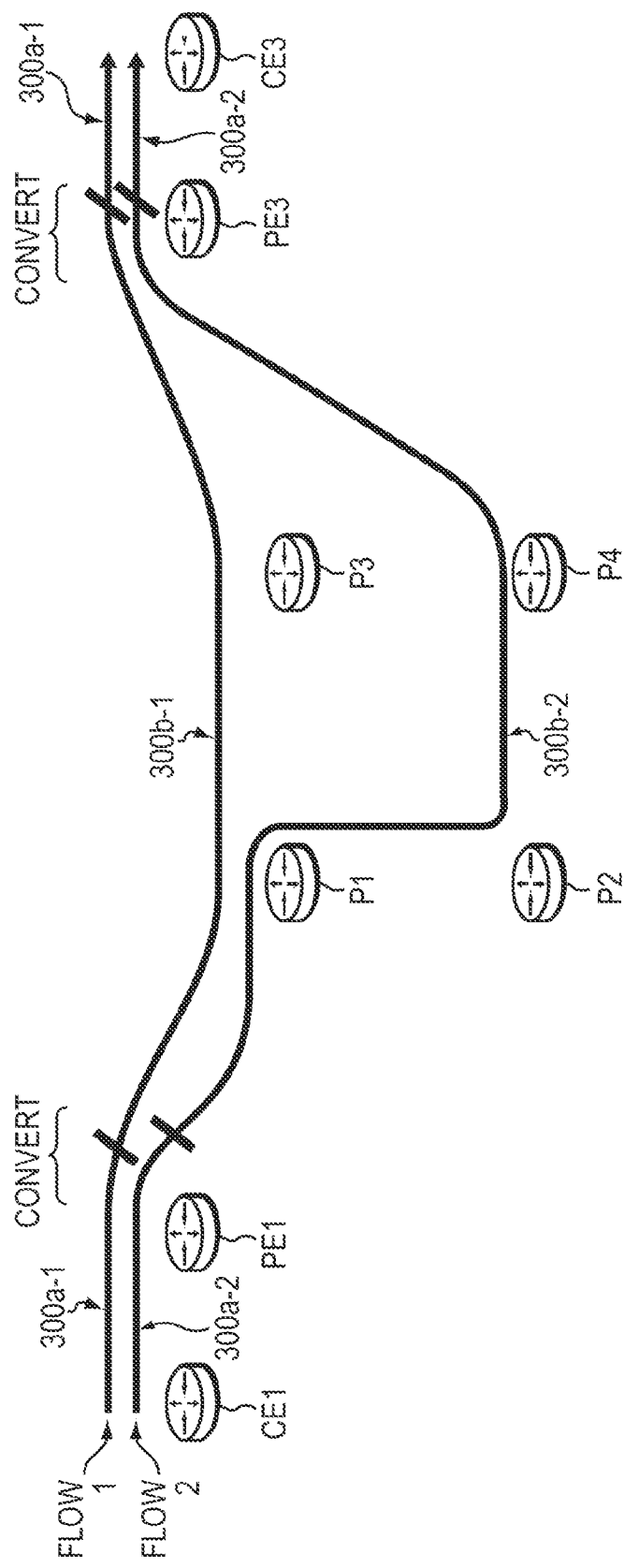

In addition, FIGS. 4B and 4C illustrate optional alternative load balancing scenarios. For instance, unlike as shown in FIG. 4A (where PE1 performs the load balancing), FIGS. 4B and 4C illustrate load balancing being performed specifically by the intermediate nodes (e.g., P1). That is, in FIG. 4A, the head-end node is shown dividing the two flows into separate load balanced paths through the intermediate network, while in FIG. 4B, P1 load balances the two flows into separate paths. Also, through contrasting FIG. 4B and FIG. 4C, the ability of the intermediate nodes (e.g., P4) to determine which paths to send the flows (via P3 in FIG. 4B versus directly to PE3 in FIG. 4C) is shown.

The illustrative embodiments presented above provides significant entropy in the hash input (load balance IDs), and therefore more chance to randomize/spread out the output. However, at the compromise of a smaller load balancing field to input in the hash, the tail-end node (egress router) may reserves a single UDP port (instead of a range of ports). For example, this may be accomplished by either assigning a well-known port or any other (in-band or out-of-band) means (e.g., configuration, signaling, etc.). The UDP Source Port field 322 may then be split into two parts, carrying the load balance ID 325 and original protocol ID 327. By doing this, the load balance field is reduced in size (e.g., 8 bits), which may still provide random enough output for situations that prefer the compromise of the size of the load-balance field to the advantage that a single port is used at the tail-end node to decapsulate, rather than a port range. In particular, assuming a single registered port value (or other shared/configured value) is used, then signaling the port ranges become unnecessary.

Notably, since the techniques described herein make use of IP encapsulation to allow load balancing, potentially all existing IP operations, administration, and management (OAM) techniques (e.g., ping, trace, etc.) may be used. Additionally, according to one or more embodiments herein, a load-balanced packet 300*b* that has a defined UDP source/destination port pair, e.g., and does not contain a UDP Payload 330, may be interpreted as an OAM packet. Such an OAM packet may be used for basic liveness detection or other uses. Accordingly, this extension allows for per-flow level OAM.

Moreover, in one or more additional embodiments, port ranges may be related to bandwidth pools, thus providing the ability to reference to available bandwidth within the network and hence perform the port allocation in that regards. Also, since the allocated receive port ranges may be signaled using BGP or IGP, port sub-ranges may be correlated with bandwidth information carried in the protocol (e.g., BGP Link Bandwidth Extended Community, Unreserved bandwidth from OSPF Link TLV, Unreserved Bandwidth (and/or Max and/or Max Reservable) sub-TLV from IS-IS Extended IS Reachability TLV, etc.).

Further, various features and/or policies may be configured while setting the source port values which essentially govern the load balancing in the network. For instance, the use of load balancing may be toggled by the head-end node, e.g., depending on a measured traffic load. Also, multiple flows may be aggregated onto a same hash/source port (load balance ID), e.g., until the accumulative traffic load of the aggregated flows goes exceeds a certain traffic load threshold. That is, different selectors may use the same port for minimalistic flows. Conversely, a single flow may be split onto different load balance IDs, thus being spread onto multiple streams, such as where the load on that flow goes beyond a certain threshold. Note that this last enhancement may lead to some amount of packet reordering in the network, and thus needs to be carefully policy driven (e.g., where per-packet load balancing is to be used).

Figure 5:
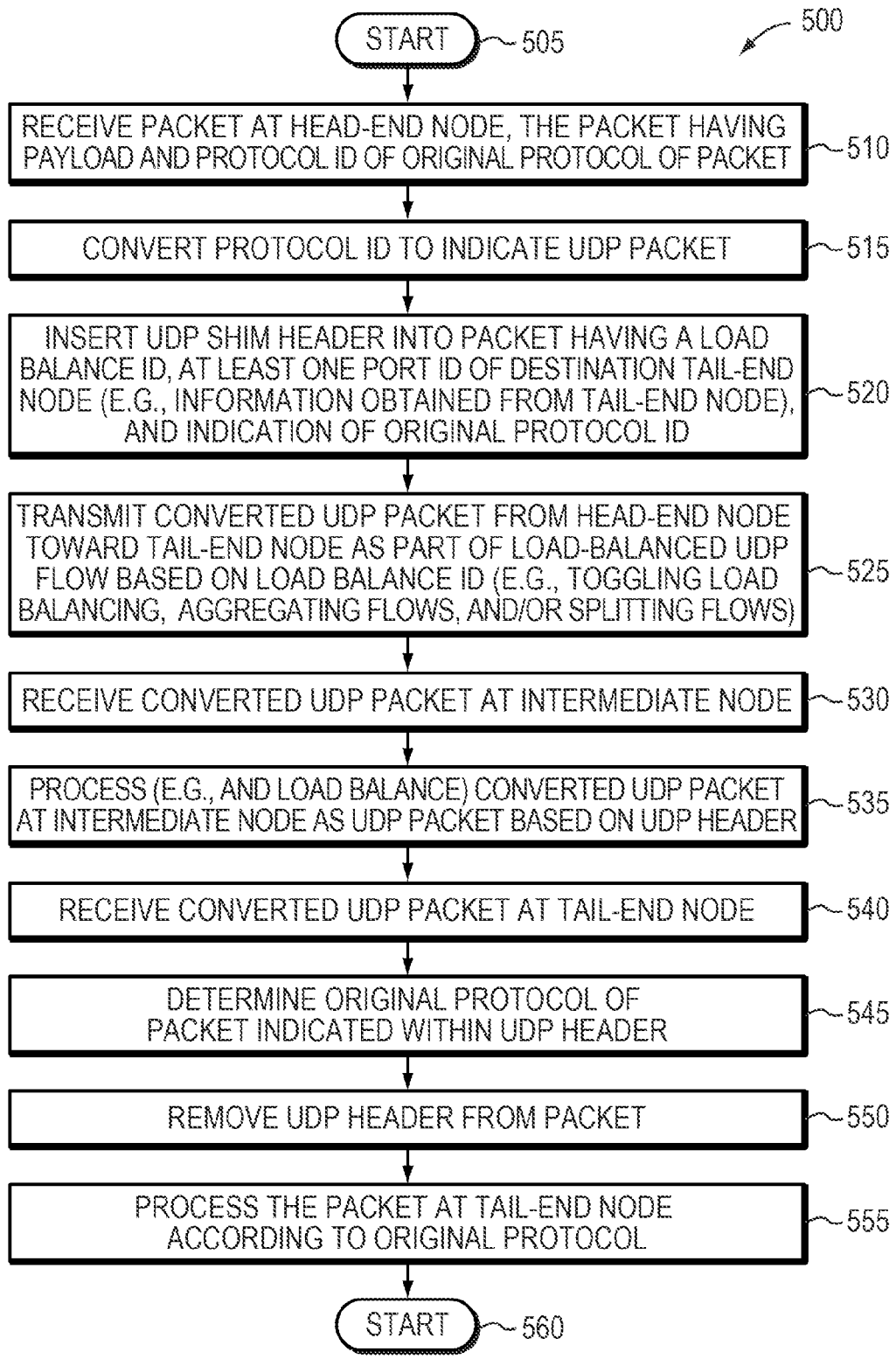
FIG. 5 illustrates an example simplified procedure for processing a load balanced packet in accordance with one or more embodiments herein.

FIG. 5 illustrates an example simplified procedure for processing a packet 300 in accordance with one or more embodiments described herein. The procedure 500 starts at step 505, and continues to step 510, where a packet 300*a* is received at head-end node, e.g., PE1, and as described above, contains a protocol ID 312*a* of an original protocol. Assuming the packet 300*a* is destined for load balancing according to the techniques herein, in step 515 the head-end node may convert the protocol ID 312*a* to indicate that the packet is a UDP packet (datagram). Accordingly, in step 520 the head-end node may insert a UDP shim header 320 into the packet having a load balance ID 325, at least one port ID 326 of destination tail-end node, and indication of original protocol ID 327. As noted above, the port ID 326 may be initially obtained from the tail-end node through advertising or other message exchange. The new, converted UDP packet 300*b* may then be transmitted from the head-end node toward the tail-end node in step 525 as part of load-balanced UDP flow based on load balance ID. Notably, as described above, within step 525 the head-end node may decide to toggle load balancing, aggregate flows, and/or split flows, according to configuration and/or policy decisions.

Any intermediate nodes (e.g., P1, P2, etc.) may receive the converted UDP packet 300*b* in step 530, and in step 535 processes the packet as a UDP packet/datagram based on the UDP header 320. For example, the intermediate nodes may perform load balancing as described above (e.g., FIGS. 4B and 4C). This continues until the packet is received in step 540 at the tail-end node (e.g., PE-3). Once at the receiving tail-end node, the converted UDP packet may be decapsulated/processed (described in more detail with reference to FIG. 6 below) such that in step 545 the original protocol of the packet indicated within UDP header is determined, the UDP header is removed in step 550, and the packet is processed in step 555 according to the original protocol. The procedure 500 ends in step 560, having transmitted a load-balanced, UDP converted (encapsulated) packet across a network.

Figure 6:
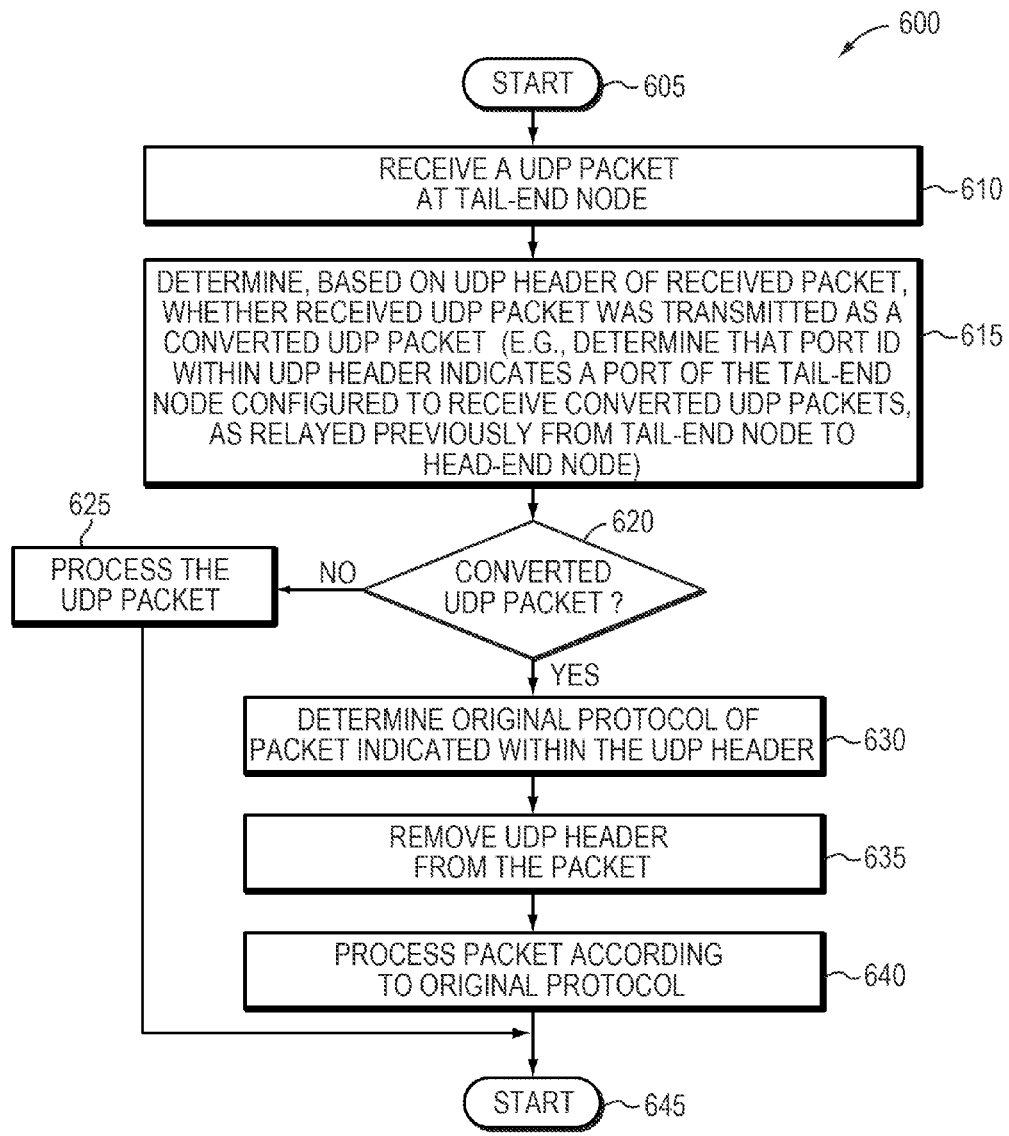
FIG. 6 illustrates another example simplified procedure for processing a load balanced packet at a receiving device in accordance with one or more embodiments herein.

As mentioned, FIG. 6 illustrates an example simplified procedure for processing UDP packets at a receiving device (tail-end node) in accordance with one or more embodiments described herein. The procedure 600 starts at step 605, and continues to step 610, where the tail-end node (e.g., PE-3) receives a UDP packet, and then proceeds to step 615, where the tail-end node may determine whether the packet is a converted UDP packet 300*b* according to the techniques herein, or a conventional UDP packet. In particular, as described herein, the tail-end node may look to the UDP header 320 of the packet to determine whether a destination port ID 326 within the header indicates a port of the tail-end node configured to receive converted UDP packets, where such port IDs were relayed to the head-end nodes of the network previously.

If in step 620 the UDP packet is a conventional packet, then the conventional UDP packet is processed in step 625. On the other hand, if in step 620 the UDP packet is a converted packet destined to a designate port of the tail-end node, then in step 630 where the UDP header 320 is again examined to determine the original protocol of the packet as indicated by field 327. The UDP header 320 may then be removed in step 635, and the packet may be processed in step 640 according to the original protocol. For instance, the packet may be re-converted for transmission under the original protocol (i.e., to original packet 300*a*), or otherwise processed at the tail-end node as instructed by the original packet's payload 330. The procedure 600 ends in step 645 until another UDP packet arrives at the tail-end node.

The novel techniques described herein allow for providing load balancing of flows of any protocol across a network with UDP capability, particularly across a network core without changes in the core, and without additional signaling overhead. By summarizing flow information into a generic load balance field in the UDP ports, which in turn increases the entropy of the packets in the core, the novel techniques allow every transport protocol (e.g., every IP protocol number) to take advantage of the load balancing without necessitating changes or updates to intermediate devices that already understand UDP (e.g., PE-only load balancing, thus not requiring changes to P-routers). Further, for those protocols (e.g., transport protocols) that do not have a demultiplexing field, such as MPLS-over-IP, IP-over-IP, GRE without a Key, IPv6-over-IP, etc., the techniques allow for load balancing without requiring deep packet inspection (DPI) on the encapsulated payload. At the same time, the techniques also do not reduce the native demultiplexing field (e.g., L2TPv3 Session ID, SPI, etc.) from the encapsulation protocol. Moreover, the dynamic aspects of one or more embodiments described herein, such as port range advertisements, alleviate the need for cumbersome and inefficient manual configuration.

While there have been shown and described illustrative embodiments that provide load balancing of flows of any protocol across a computer network, it is to be understood that various other adaptations and modifications may be made within the spirit and scope of the embodiments herein. For example, the embodiments have been shown and described herein with direct relation to UDP. However, the embodiments in their broader sense are not so limited, and may, in fact, be used with other suitable protocols that essentially function in a similar manner to UDP, and that is understood by the intermediate nodes along the load-balanced paths between head-end nodes and tail-end nodes (e.g., UDP-Lite and other non-UDP-related protocols). Also, the techniques herein may be read by some as being generally explained in the context of pseudowires and/or Mesh Softwires, and specifically BGP Encaps SAFI (subsequent address family identifier) signaling as an example. However, the embodiments herein are not limited to this interpretation, and are generally applicable.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving a packet at a head-end node in a computer network, the packet having a payload and an original protocol identifier (ID) of an original protocol of the packet;
converting the original protocol ID to indicate a user datagram protocol (UDP) packet format, wherein converting the original protocol ID of the received packet to indicate the UDP packet format creates a converted UDP packet;
inserting a UDP shim header into the converted UDP packet, the header having a load balance ID, at least one port ID of a destination tail-end node of the packet, and an indication of the original protocol ID; and
transmitting the converted UDP packet from the head-end node toward the destination tail-end node as part of a load-balanced UDP flow based on the load balance ID.

2. The method as in claim 1, further comprising:
receiving the converted UDP packet at the destination tail-end node;
determining that the received converted UDP packet was transmitted as the converted UDP packet based on the UDP shim header; and
in response to determining that the received converted UDP packet was transmitted as the converted UDP packet based on the UDP shim header:
determining the original protocol indicated within the UDP header;
removing the UDP shim header from the converted UDP packet; and
processing the converted UDP packet, having removed the UDP shim header, according to the original protocol.

3. The method as in claim 2, wherein determining that the received converted UDP packet was transmitted as the converted UDP packet based on the UDP shim header comprises:
determining that the port ID of the destination tail-end node within the UDP shim header indicates a port of the tail-end node configured to receive converted UDP packets.

4. The method as in claim 1, wherein the UDP shim header has a source port field and a destination port field, the source port field encoding the load balance ID, the destination port field encoding a range of port IDs of the destination tail-end node of the packet and the indication of the original protocol ID.

5. The method as in claim 4, further comprising:
utilizing sub-ranges within the range of port IDs based on bandwidth information of the computer network.

6. The method as in claim 1, wherein the UDP shim header has a source port field and a destination port field, the source port field encoding the load balance ID and the indication of the original protocol ID, the destination port field encoding a single port ID of the destination tail-end node of the packet.

7. The method as in claim 1, wherein the load balance ID corresponds to a flow ID associated with the packet.

8. The method as in claim 1, wherein the head-end node and the destination tail-end node are provider edge (PE) devices of a provider network.

9. The method as in claim 1, further comprising:
relaying port ID information of the destination tail-end node to the head-end node via an advertising routing protocol used within the computer network.

10. The method as in claim 1, further comprising:
toggling use of load balancing by the head-end node based on a traffic load within the computer network.

11. The method as in claim 1, wherein the received packet is on a flow of a plurality of flows, the method further comprising:
aggregating flows of the plurality of flows to a same load balance ID by the head-end node until the aggregated flows exceed a traffic load threshold.

12. The method as in claim 1, wherein the received packet is on a flow, the method further comprising:
splitting the flow onto different load balance IDs.

13. The method as in claim 1, further comprising:
receiving the converted UDP packet at an intermediate node between the head-end node and tail-end node; and
processing the converted UDP packet at the intermediate node as a UDP packet based on the UDP header.

14. The method as in claim 1, wherein the original protocol is selected from a group consisting of: an Internet Protocol (IP), a virtual interface (VI) protocol, a tunnel protocol, a pseudowire protocol, a layer-2 tunneling protocol (L2TP)-over-IP protocol, a generic route encapsulation (GRE) protocol, an IP-in-IP protocol, an encapsulating security payload (ESP) protocol, an authentication header (AH) protocol, an IP version 6 (IPv6) protocol, an IP version 4 (IPv4) protocol, an IPv6-in-IP protocol, a multiprotocol label switching (MPLS)-in-IP protocol, a resource reservation protocol (RSVP), and a universal transport interface (UTI) protocol.

15. A method, comprising:
   receiving a user datagram protocol (UDP) packet at a tail-end node in a computer network, the packet having a UDP header and a payload;
   determining, based on the UDP header of the received packet, whether the received UDP packet was transmitted as a converted UDP packet as part of a load-balanced UDP flow; and
   in response to determining that the received UDP packet was transmitted as the converted UDP packet:
      determining an original protocol of the packet indicated within the UDP header;
      removing the UDP header from the packet; and
      processing the packet according to the original protocol.

16. The method as in claim 15, wherein determining that the received UDP packet was transmitted as the converted UDP packet comprises:
   determining that a port identifier (ID) within the UDP header indicates a port of the tail-end node configured to receive converted UDP packets.

17. The method as in claim 16, further comprising:
   relaying, via an advertising routing protocol used within the computer network, port ID information of the tail-end node to a head-end node configured to convert the UDP packet.

18. An apparatus, comprising:
   one or more network interfaces adapted to receive a packet from a computer network, the packet having a payload and an original protocol identifier (ID) of an original protocol of the packet;
   a processor coupled to the network interfaces and adapted to execute one or more processes; and
   a memory adapted to store a process executable by the processor, the process when executed operable to:
      convert the protocol ID of the received packet to indicate a user datagram protocol (UDP) packet format, wherein converting the original protocol ID of the received packet to indicate the UDP packet format creates a converted UDP packet;
      insert a UDP shim header into the received packet, the header having a load balance ID, at least one port ID of a destination tail-end node of the packet, and an indication of the original protocol ID; and
      transmit the converted UDP packet toward the destination tail-end node as part of a load-balanced UDP flow based on the load balance ID.

19. The apparatus as in claim 18, wherein the process when executed is further operable to:
   receive a second UDP packet having a second UDP header;
   determine, based on the second UDP header of the second UDP packet, whether the second UDP packet was transmitted as a second converted UDP packet; and
   in response to determining that the received second UDP packet was transmitted as the second converted UDP packet:
      determine an original protocol of the received second UDP packet indicated within the second UDP header;
      remove the second UDP header from the received second UDP packet to create a received second packet; and
      process the received second packet according to the original protocol.

20. An apparatus, comprising:
   one or more network interfaces adapted to receiving a user datagram protocol (UDP) packet from a computer network, the packet having a UDP header and a payload;
   a processor coupled to the one or more network interfaces and adapted to execute one or more processes; and
   a memory adapted to store a process executable by the processor, the process when executed operable to:
      determine, based on the UDP header of the received UDP packet, whether the received UDP packet was transmitted as a converted UDP packet as part of a load-balanced UDP flow; and
      in response to determining that the received UDP packet was transmitted as the converted UDP packet:
      determine an original protocol of the received UDP packet indicated within the UDP header;
      remove the UDP header from the received UDP packet to create a received packet; and
      process the received packet according to the original protocol.

* * * * *